United States Patent
Kohlrausch

(10) Patent No.: US 6,946,810 B2
(45) Date of Patent: Sep. 20, 2005

(54) WINDSCREEN WIPER SYSTEM COMPRISING TWO OPPOSED WIPERS

(75) Inventor: Philipp Kohlrausch, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/250,731

(22) PCT Filed: Dec. 18, 2002

(86) PCT No.: PCT/DE02/04651
§ 371 (c)(1),
(2), (4) Date: Jul. 9, 2003

(87) PCT Pub. No.: WO03/051692
PCT Pub. Date: Jun. 26, 2003

(65) Prior Publication Data
US 2004/0051491 A1 Mar. 18, 2004

(30) Foreign Application Priority Data
Dec. 19, 2001 (DE) .......................... 101 62 679
Sep. 30, 2002 (DE) .......................... 102 45 966

(51) Int. Cl.⁷ ............................. H02P 1/04; H02P 5/00; H02P 7/00
(52) U.S. Cl. ................................ 318/443; 318/DIG. 2; 318/255; 318/281; 15/215.17; 15/250.28
(58) Field of Search .......................... 15/250.22, 250.1, 15/250.11, 250.12, 250.14, 250.17, 250.28, 250.29, 250.3, 256.5, 256.53, 250.21, 250.23, 250.13; 318/DIG. 2, 280–286, 444, 264–266, 256, 466–470, 443, 445, 102, 119, 162, 281, 431, 625

(56) References Cited

U.S. PATENT DOCUMENTS

| | | | | |
|---|---|---|---|---|
| 3,590,415 A | * | 7/1971 | Mori | 15/250.21 |
| 3,599,270 A | * | 8/1971 | Mori | 15/250.23 |
| 4,866,357 A | * | 9/1989 | Miller et al. | 318/443 |
| 5,177,418 A | * | 1/1993 | Muller | 318/265 |
| 5,226,200 A | * | 7/1993 | Buchanan et al. | 15/250.13 |
| 5,635,807 A | * | 6/1997 | Lautzenhiser | 318/625 |
| 6,157,154 A | * | 12/2000 | Amagasa | 318/443 |
| 6,288,509 B1 | * | 9/2001 | Amagasa | 318/443 |
| 6,425,160 B1 | * | 7/2002 | Saito | 15/250.22 |
| 6,703,804 B1 | * | 3/2004 | Courdier et al. | 318/445 |

FOREIGN PATENT DOCUMENTS

| | | |
|---|---|---|
| DE | 32 08 121 A | 9/1983 |
| EP | 0 953 499 A | 11/1999 |
| FR | 2 785 246 A | 5/2000 |
| WO | 98 29285 A | 7/1998 |

* cited by examiner

Primary Examiner—Marlon T. Fletcher
Assistant Examiner—Renata McCloud
(74) Attorney, Agent, or Firm—Michael J. Striker

(57) ABSTRACT

The invention relates to a windshield wiper system with two wipers (1, 2) that travel in opposite directions and can each be driven by a separate motor ($M_{FS}$, $M_{BS}$), wherein a regulating unit (7) is provided for triggering the motors ($M_{FS}$, $M_{BS}$) separately from each other by means of control signals, wherein the regulating unit (7) triggers the motors ($M_{FS}$, $M_{BS}$) of the wipers (1, 2) in order to preset a time-dependent angular position of the wipers according to a trigonometric function $\phi(t)$.

3 Claims, 3 Drawing Sheets

WINDSCREEN WIPER SYSTEM COMPRISING TWO OPPOSED WIPERS

BACKGROUND OF THE INVENTION

The invention relates to a windshield wiper system with two wipers that travel in opposite directions. In an opposed-pattern wiper system, the wipers travel in opposite directions. The wipers are driven by a drive unit, the two wipers being coupled to each other by means of a mechanism in such a way that the wipers do not collide during operation.

Up till now, the angular preadjustment of the opposed-pattern wipers has been manually set. This is carried out based on individual, manually determined angular positions of the wipers in which the wipers do not touch. Then, these angular positions are connected to one another by means of control curves, based on cubic curve elements. The disadvantage here is that this does not absolutely guarantee that collisions will be prevented; whether the wipers collide or not depends instead on the experience of the development engineer. Moreover, the curve elements are not suitable for a regulation since the curves can only be time-differentiated once, as a result of which the desired curves generate instabilities in the course of accelerations. This causes the wipers to chatter.

The object of the current invention, therefore, is to design the control of opposed-pattern wipers so that the wipers do not chatter or collide during operation.

SUMMARY OF THE INVENTION

The invention proposes a windshield wiper system with two wipers that travel in opposite directions and can each be driven by a separate motor. A regulating unit is also provided for triggering the motors separately from each other by means of control signals. The regulating unit triggers the motors of the wipers in order to preset a time-dependent angular position of the wipers according to a trigonometric function $\phi(t)$.

The invention is comprised of creating a regulating unit for a windshield wiper system with two wipers that travel in opposite directions. The regulating unit should prevent the disadvantages of the prior art, in particular a chattering of the wipers and a possible collision of the wipers. In particular, the wipers have a distinct tendency to chatter in the vicinity of the reversal points. With this in mind, the invention proposes embodying the regulating unit in such a way that the wiper angle is an essentially trigonometric function. The trigonometric function has the advantage that it can be time-differentiated any number of times so that no instabilities are generated in the course of accelerations of the wipers, thus on the one hand allowing the prevention of chattering, and on the other, minimizing the electrical energy required for the movement of the wipers.

In addition, trigonometric functions are suitable for regulating the wipers since comparatively simple conditions can be defined for preventing collisions of the opposed-pattern wipers.

Trigonometric functions, e.g. sine and cosine functions, are the fundamental element of the wiping curves that form the basis of the regulation. These trigonometric functions are infinitely smooth and can be time-differentiated any number of times. This means that no abrupt excitations, e.g. due to acceleration changes, are introduced into the system. Furthermore, the trigonometric functions offer the possibility of calculating a pilot control based on a dynamic physical model, based directly on the trigonometric functions. A pilot control of this kind can improve a regulation significantly.

The use of trigonometric functions for regulating the wipers also has the advantage that the wiping curves can be unambiguously determined by means of a small number of parameters. This permits the regulation to be used in a simple and efficient way.

Preferably, the trigonometric functions are equivalent to:

$$\overline{\varphi}_{BS}(t) = -\frac{\varphi_{max}}{2}\left(\sin(\omega t + \gamma) + \frac{1}{k}\cos(2(\omega t + \gamma) + 1) - \frac{1}{q}\sin 3(\omega t + \gamma) - 1\right)\frac{q}{1+q} \quad (1a)$$

$$\overline{\varphi}_{FS}(t) = -\frac{\varphi_{max}}{2}\left(\sin(\omega t - \gamma) + \frac{1}{k}\cos(2(\omega t - \gamma) + 1) - \frac{1}{q}\sin 3(\omega t - \gamma) + 1\right)\frac{q}{1+q}, \quad (1b)$$

where $\phi_{BS}$ is the instantaneous angle on the passenger side and $\phi_{FS}$ is the instantaneous angle on the driver's side. The term $\phi_{max}$ indicates the wiping range and $\omega$ indicates the angular velocity that depends on the period of the wiper. The variable $\gamma$ indicates the phase angle of the wiping motion. The variables k and q are parameters that are selected to prevent collisions of the two wipers. With the aid of the thus-selected trigonometric functions, it is possible to produce a windshield wiper system with opposed-pattern wipers in which the wipers do not chatter because erratic changes in the acceleration of the wipers are prevented. Moreover, by determining the parameters k and q, it is comparatively easy to operate the wipers in a mutually phase-shifted fashion, so that collisions are prevented.

Preferably, the parameters k and q are selected so that the wiping speed of a wiper exceeds a minimal value in least at one reversal point, thus preventing the wiper from chattering against the windshield. Since wiper chatter can occur particularly when the wiping speed is too low, a particular selection of the parameters k and q assures that the speeds of the wipers close to the reversal points exceed the relevant minimal value.

It is also advantageous for k and q to be selected so that the angular paths of the wipers travel between the upper and lower reversal points with no change of direction in the wiper movement.

BRIEF DESCRIPTION OF DRAWINGS

A preferred embodiment of the invention will be explained in detail below in conjunction with the accompanying drawings.

DETAILED DESCRIPTION OF THE PREFERRED EMBODIMENTS

Figure 1:
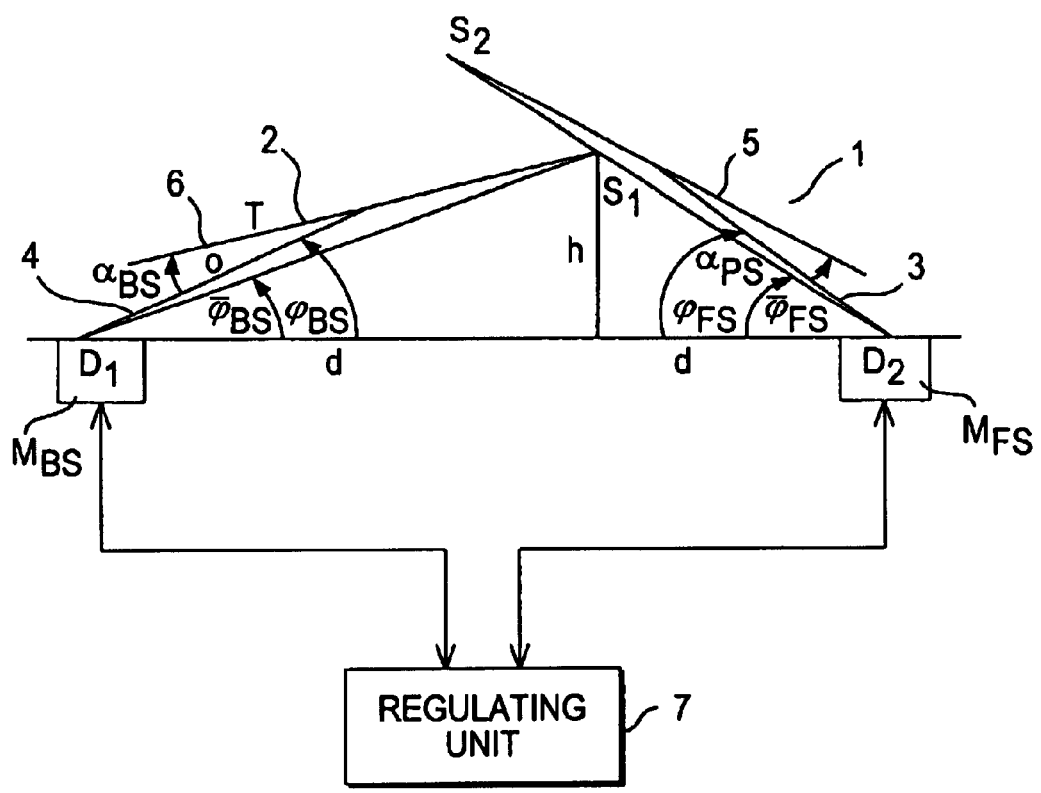
FIG. 1 shows a schematic embodiment of the windshield wiper system according to the invention.

FIG. 1 schematically depicts a preferred embodiment of a windshield wiper system with two wipers that travel in opposite directions. The windshield wiper system has a driver's side wiper 1 and a passenger side wiper 2. The driver's side wiper 1 includes a driver's side wiper arm 3 and a driver's side wiper blade 5, which is attached to one end of the driver's side wiper arm 3. The passenger side wiper 2 includes a passenger side wiper arm 4 and a passenger side wiper blade 6.

The respective other ends of the wiper arms 3, 4 are each connected to a drive unit $M_{FS}$, $M_{BS}$. The driver's side drive unit $M_{FS}$ drives the driver's side wiper 1 and the passenger side drive unit $M_{BS}$ drives the passenger side wiper 2. The driver's side drive unit $M_{FS}$ and the passenger side drive unit $M_{BS}$ are each connected to a regulating unit 7, which moves the drive units $M_{FS}$, $M_{BS}$ in accordance with a predetermined angular position. The control of the drive units $M_{FS}$, $M_{BS}$ is preferably executed with the aid of a pulse-width modulation in which branch currents are output to the drive units $M_{FS}$, $M_{BS}$ as control variables. In order to carry out the regulation in the regulating unit 7, the regulating unit 7 receives position and/or movement or speed data from the drive units $M_{FS}$, $M_{BS}$, in order to determine the next control variables based on them.

The regulating unit 7 is designed so that the angles to be set for the driver's side wiper 5 and for the passenger side wiper 6 are set in accordance with a trigonometric function. This means that the angular path is not determined, as was previously the case, based on cubic curve elements that are set between empirically determined wiper positions, but is determined on the basis of a trigonometric function with form parameters that are selected so that the wipers can be prevented from chattering and colliding.

The following terms are used to describe the windshield wiper system: the parameters that refer to the passenger side are labeled with the index BS; the parameters that refer to the driver's side are labeled with the index FS. The distance between the fulcrums D1, D2 of the two wiper arms 3, 4 is labeled with the letter d, the letter a indicates the length of a wiper arm, and the letter r represents half the length of the wiper blades 5, 6. The letter l indicates the length of an imaginary connection between one of the fulcrums D1, D2 and the tip of the corresponding wiper blade 5, 6. The angles between d and l are labeled $\bar{\phi}_{FS}$ and $\bar{\phi}_{BS}$. The terms $\bar{\phi}_{FS}$ and $\bar{\phi}_{BS}$ denote the angles between d and a. All angles are defined as positive in the direction of the upward-sweeping wipers.

The time response graph of the wiper arm angle must be determined so that it is not possible for the wipers to collide. In order for the two wiper drive units $M_{FS}$, $M_{BS}$ to exert approximately the same amount of work over a wiping cycle, the wiping curves should have the same shape; they are merely reflected at the abscissa and shifted. Expressed in formula terms, this means that:

$$\phi_{FS} = F(t)$$

$$\phi_{BS} = -F(t-\tau) + \kappa,$$

where F is a periodic function over time t. The phase shift τ and the shift factor κ are selected so that $\bar{\phi}_{FS}$ and $\bar{\phi}_{BS}$ pass through the lower and upper reversal points at the same time.

Since a pure sine function cannot be used in the selection of the trigonometric function, since it produces a collision in the lower reversal point of the wipers, a sinusoidal function is required, which presets an angular position of the wipers that is wider than the pure sine function in the one reversal point of the wipers and is narrower than the pure sine function in the other reversal point of the wipers.

This distortion must be selected so that the wipers do not collide during the wiping motion.

On the other hand, the curvature of the desired trajectory in the reversal points cannot be too slight since at insufficient speeds in the reversal points, the wiper rubber can momentarily stick to the windshield, thus causing the wiper to chatter against the windshield.

The desired trigonometric function can be comprised of sine and cosine components. It has been determined that it is best for the trigonometric function to be comprised of a sum of sine and cosine components. A sine function is added to a cosine function with a doubled frequency and an offset of 1. The cosine function is weighted with the factor k. The parameter k can be used to vary the distortion (bulging) of the function. In order to prevent the desired trajectory in the reversal points from becoming too flat, an additional sine component with a tripled frequency is added. This component is weighted with the factor q. The wiping regions are defined by $\bar{\phi}_{FS} \in [0, \phi_{max}]$ and $\bar{\phi}_{BS} \in [0, \phi_{max}]$. The chronological courses $\bar{\phi}_{BS}(t)$ and $\bar{\phi}_{FS}(t)$ are defined as:

$$\bar{\phi}_{BS}(t) = -\frac{\varphi_{max}}{2}\left(\sin(\omega t + \gamma) + \frac{1}{k}\cos(2(\omega t + \gamma) + 1) - \frac{1}{q}\sin 3(\omega t + \gamma) - 1\right)\frac{q}{1+q} \quad (1a)$$

$$\bar{\phi}_{FS}(t) = -\frac{\varphi_{max}}{2}\left(\sin(\omega t - \gamma) + \frac{1}{k}\cos(2(\omega t - \gamma) + 1) - \frac{1}{q}\sin 3(\omega t - \gamma) + 1\right)\frac{q}{1+q}, \quad (1b)$$

where $$\omega = \frac{2\pi}{T}$$

indicates the angular velocity, T indicates the period, and $$\gamma = \frac{\pi}{2}$$

indicates the phase angle of the wiping motion. The parameters k and q are selected to prevent the two wipers from colliding.

Figure 2A:
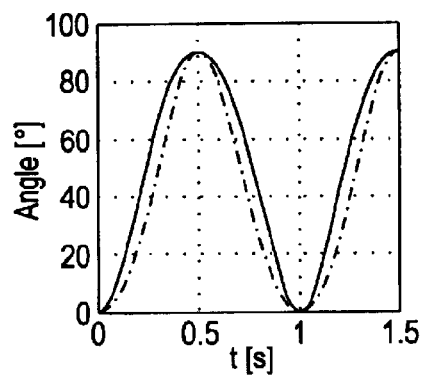
FIG. 2 shows different time response graphs for $\phi_{FS}$ and $\phi_{BS}$ as a function of k and q.

FIGS. 2a to 2d show how the influences of k and q affect the wiping curves. FIG. 2a shows the time responses for $\bar{\phi}_{FS}$ (solid line) and $\bar{\phi}_{BS}$ (dashed line), with k=10 and q=100. The y-axis indicates the angle and the x-axis indicates time in seconds. After 0.5 seconds, both wiper arms reach the upper reversal point. The slope close to the reversal points according to the curves given in FIG. 2a indicates the speed close to the reversal point. If the slope there is too slight, i.e. the wipers are moving slowly, then it is possible for a sticking and therefore a chattering of the wipers to occur. After one second, both wiper arms reach a lower reversal point. Here, too, the speed of the wiper arms close to the reversal points must exceed a minimal value; in addition, the two curves close to the lower reversal point must be far enough apart that the wiper arms do not collide.

Figure 2B:
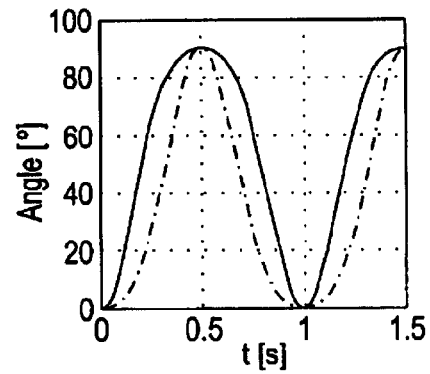

FIG. 2b shows a time behavior graph for $\bar{\phi}_{FS}$ and $\bar{\phi}_{BS}$, with the parameters k=5 and q=100. It is clear that the wiping curve of the driver's side wiper becomes very flat at the upper reversal point so that the speed there is very low and a sticking, i.e. a chattering, of the wiper can occur. The wiping curve of the passenger side wiper 2 is also very flat close to the lower reversal point so that a chattering can occur there as well.

Figure 2C:
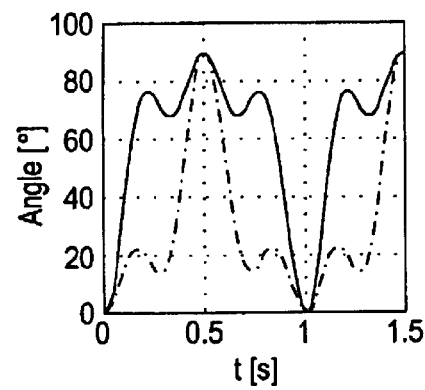

FIG. 2c shows the angular paths with the parameters k=2 and q=2. The speeds in the reversal points are clearly sufficient, but a temporary reversal of direction occurs between the upper and lower reversal point. This is an unfavorable occurrence since the path of the wiper is supposed to travel continuously from the upper reversal point to the lower reversal point and vice versa, because otherwise, the back-and-forth motion of the wiper interferes with the field of vision.

Figure 2D:
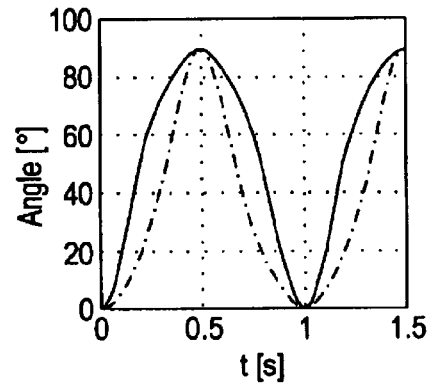

FIG. 2d shows the angular path of the wipers for the parameters k=5 and q=15. It depicts a continuous wiping path between the upper and lower reversal points, a sufficient slope in the vicinity of the upper and lower reversal points, and a sufficient distance between the angular paths for the driver's side and passenger side wipers 1, 2.

The path of the wipers depicted in FIG. 2d represents a suitable path. The discussion below will explore how the suitable parameters k and q can be found.

Since the time behavior graphs for $\bar{\varphi}_{FS}$ and $\bar{\varphi}_{BS}$ are determined except for the weighting parameters, a criterion should now be established below for determining the parameters k and q.

Simply stated, the geometry of the windshield wiper system can be studied using the triangle with the vertices D1, D2, S1, as shown in FIG. 1. The angle $\bar{\varphi}_{FS}$ is produced by virtue of the fact that $S_1$ travels along the connecting line D2, S2' between the passenger side fulcrum and the outer tip of the passenger side wiper blade (point s2). The distance between the two fulcrums is labeled d; the height of the imaginary triangle is labeled 2h. In this instance, the following apply:

$$\tan\bar{\varphi}_{FS} = \frac{h}{d_2} \quad (2)$$

$$h = l\sin\bar{\varphi}_{BS}$$

$$d_2 = d - l\cos\bar{\varphi}_{BS}$$

$$\bar{\varphi}_{FS} = \arctan\left(\frac{l\sin\bar{\varphi}_{BS}}{d - l\cos\bar{\varphi}_{BS}}\right) = g(\bar{\varphi}_{BS}).$$

If the relation $$\bar{\varphi}_{FS}(t) \leq g(\bar{\varphi}_{BS}(t)), \quad (3)$$

is selected, then no collisions of the wipers occur.

The object now is to select q and k so that the condition (3) is fulfilled. In order for a condition to be considered sufficient, the slope $$\frac{d\bar{\varphi}_{FS}(t)}{d\bar{\varphi}_{BS}(t)}$$

at the origin must be greater than or equal to $g'(\bar{\varphi}_{FS})$ at the origin. This is illustrated in FIG. 3.

Figure 3:
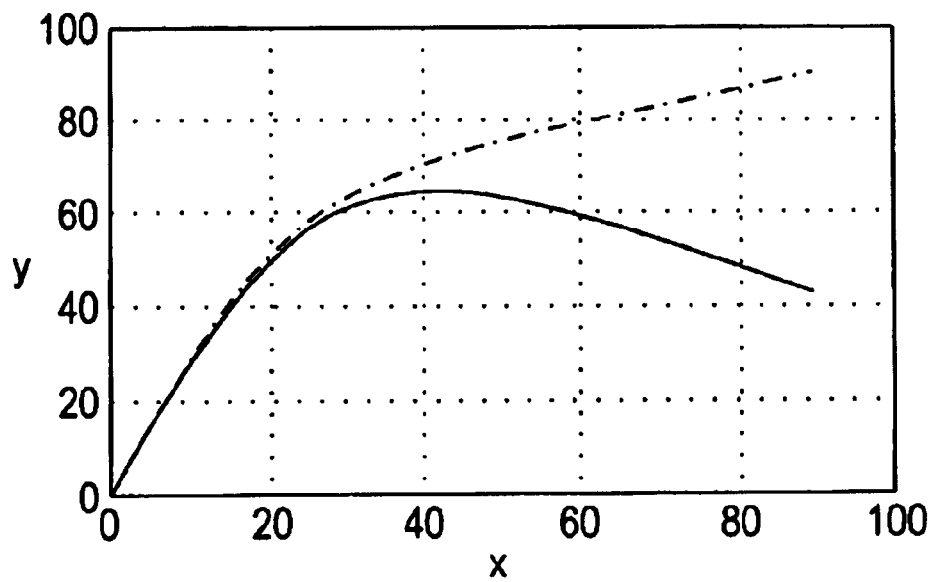
FIG. 3 shows an xy graph for comparing y=gc x' to the parameter representation x=$\phi_{FS}$ (t), y=$\phi_{BS}$(t)

FIG. 3 is a parameter depiction $x=\bar{\varphi}_{FS}(t)$, $y=\bar{\varphi}_{BS}(t)$, with the parameters k=5, q=15 and 1/d=¾. In FIG. 3, the parameters k and q are selected so that the two curves leave the origin with the same slope. If there are no additional turning points, then the graph of the parameter depiction of the wiping paths is disposed above the graph of d. The differentiation of equation (2) with x=0 is $$g'(0) = \frac{l\cos(0)(d - l\cos(0)) + l^2\sin(0)^2}{(d - l\cos(0))^2} = \frac{l}{d-l}.$$

This then requires that $$\left.\frac{d\bar{\varphi}_{FS}(t)}{d\bar{\varphi}_{BS}(t)}\right|_{t=0} \geq g', \text{ with}$$

$$\frac{d\bar{\varphi}_{FS}(t)}{d\bar{\varphi}_{BS}(t)} = \frac{d\bar{\varphi}_{FS}(t)}{dt}\frac{dt}{d\bar{\varphi}_{BS}(t)} = \frac{d}{dt}\bar{\varphi}_{FS}(t)\left(\frac{d}{dt}\bar{\varphi}_{BS}(t)\right)^{-1}.$$

The slope at the origin can be found according to the L'Hospital rule:

$$\left.\frac{d\bar{\varphi}_{FS}(t)}{d\bar{\varphi}_{BS}(t)}\right|_{t=0} = \frac{kq + 4q + 9k}{kq - 4q + 9k} \geq \frac{l}{d-l} = \rho \geq 1. \quad (4)$$

The relation $\rho \geq 1$ is true since $\rho \geq d/2$. This equation can now be rearranged according to q or k:

$$q \geq \frac{9k(1-\rho)}{(\rho k - k - 4 - 4\rho)} \quad (5)$$

$$k \leq \frac{4q(1+\rho)}{(-q - 9 + \rho q + 9\rho)}. \quad (6)$$

Figure 4:
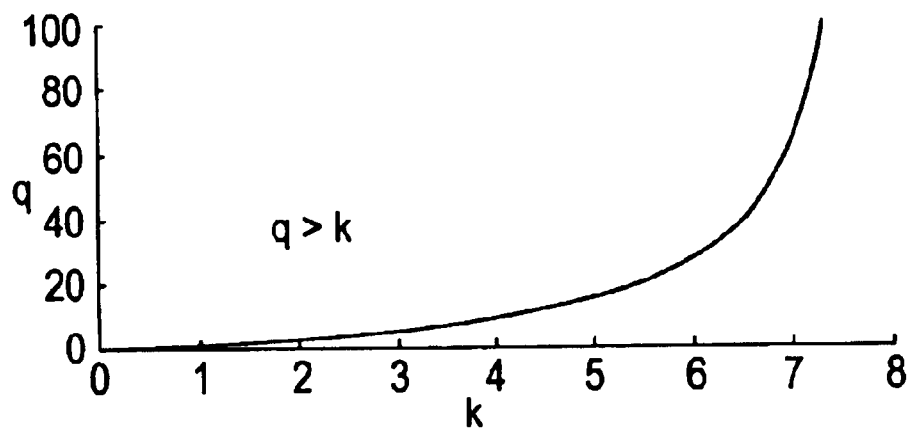
FIG. 4 shows a representation of the equation 5 with the parameter p=3.

The discussion below will explore how k and q are selected in the driver's side wiping path. FIG. 4 depicts the permissible range for k and q according to equation (5). It is conceivable that with a predetermined q, the associated k should lie close to the graph of equation (5). The greater k is selected to be, the slower the respective drive unit of the wiper is accelerated since the distortion of the sine curve is reduced. On the other hand, the equation $$k = 4\frac{\rho+1}{\rho-1}$$

yields a singularity according to equation (5). At the top end, k is limited by $$k \leq 4\frac{\rho+1}{\rho-1}.$$

Based on these considerations, q should then lie on the graph $$q = \frac{9k(1-\rho)}{(\rho k - k - 4 - 4\rho)}, \quad (7)$$

which is depicted in FIG. 4.

Now, the unknown parameter k must be determined. If the parameter k is selected as being close to its upper limit, then q loses influence, i.e. no additional curvature is produced at the reversal points. This would correspond to a curve of the kind shown in FIG. 2b.

On the other hand, q cannot be selected as being too small since this causes a powerful distortion at the locus t=T/4. This would correspond to the curve shown in FIG. 2c.

The system variables of the wiper drive unit can be calculated by means of an infinite number of time derivations. The system variables can include current, voltage, motor angle, motor speed, wiper speed, and others. Since the equations (1a) and (1b) can be time-differentiated any number of times, the voltage in the drive motor u and the current in the armature circuit I can be calculated directly based on these equations, as a function of k and time t.

Now a cost function K is formulated, which can subsequently be minimized. For example, the electrical energy consumed during one cycle can be selected as a cost function.

$$K = \int_0^T U(t,k) I(t,k) dt$$

The parameter k is found according to the following scheme:
 calculate q (k) according to equation (7);
 calculate U and I by means of the inverse system;
 establish cost function K for k;
 vary k until K is minimal.

In order to find K(k), simple numerical processes can be used, for example a simplex process.

In the derivation of the condition for collision prevention according to equation (5), the geometric arrangement of the wipers was assumed, in a simplified fashion, to be a triangle. Actually, the smallest distance between the wipers is greater since they do not rest directly against each other in the lower reversal point. However, in order to be able to meaningfully calculate using equation (5), the length of the lower wiper can be established as shorter. To this end, 1=1+s is substituted into equation (4), where f is selected as negative. If a positive s is selected, then the clearance between the two wipers can be increased.

The selection of a trigonometric function to determine the wiping curves of the wipers can result in a number of advantages. On the one hand, the system variables of the wiper drive unit, such as current, voltage, motor angle, motor speed, and wiper speed can be calculated with relative ease through an infinite number of time derivations. This is particularly easy to accomplish with trigonometric functions. On the other hand, conditions can be defined, e.g. the collision prevention condition, i.e. a minimal speed in the vicinity of the reversal points, which can be implemented with comparative ease by means of parameters in the predetermined trigonometric function.

What is claimed is:

1. A windshield wiper system is provided with two wipers (1, 2) that travel in opposite directions and are each drivable by a separate motor ($M_{FS}$, $M_{BS}$), wherein a regulating unit (7) is provided for triggering the motors ($M_{FS}$, $M_{BS}$) separately from each other by means of control signals, wherein the regulating unit (7) triggers the motors ($M_{FS}$, $M_{BS}$) of the wipers (1, 2) in order to preset a time-dependent angular position of the wipers according to a trigonometric function ($\phi(t)$), wherein the trigonometric function is a sinusoidal function, wherein said sinusoidal function presets the angular position of the wipers to be wider than an angular position that is preset according to a pure sine function in a first reversal point of the wipers and wherein said sinusoidal function preset the angular position of the wipers to be narrower than the angular position that is present according to the pure sine function in a second reversal point of the wipers, wherein the trigonometric function for the wiper (1, 2) of a passenger side corresponds to:

$$\overline{\varphi}_{BS}(t) = -\frac{\varphi_{\max}}{2}\left(\sin(\omega t + \gamma) + \frac{1}{k}\cos(2(\omega t + \gamma) + 1) - \frac{1}{q}\sin 3(\omega t + \gamma) - 1\right)\frac{q}{1+q},$$

and the trigonometric function for the winer of a driver's side corresponds to:

$$\overline{\varphi}_{FS}(t) = -\frac{\varphi_{\max}}{2}\left(\sin(\omega t - \gamma) + \frac{1}{k}\cos(2(\omega t - \gamma) + 1) - \frac{1}{q}\sin 3(\omega t - \gamma) + 1\right)\frac{q}{1+q},$$

where $\phi_{BS}$ is instantaneous angle on the driver's side and $\phi_{FS}$ is the instantaneous angle on the driver's side, where $\phi_{max}$ indicates the wiping range, where ω corresponds to the angular velocity that depends on the period, and y corresponds to the phase angle of the wiping motion, where k and q are parameters that are selected to prevent collisions of the two wipers.

2. The windshield wiper system according to claim 1, wherein k and q are selected so that the wiping speed of the wipers (1, 2) exceeds a minimal value in least at one of the first and second reversal points so that the wipers (1, 2) are prevented from chattering against the windshield.

3. The windshield wiper system according to claim 1, wherein k and q are selected so that the angular paths of the wipers travel from an upper reversal point to a lower reversal point with no change of direction in the wiper movement.

* * * * *